Sept. 13, 1955  H. S. HOFFMAN  2,717,624
ANTI-SKID CHAIN

Filed Aug. 13, 1952  3 Sheets-Sheet 1

INVENTOR
*Herman S. Hoffman*

BY *Stevens, Davis, Miller and Mosher*
ATTORNEYS

Sept. 13, 1955  H. S. HOFFMAN  2,717,624
ANTI-SKID CHAIN
Filed Aug. 13, 1952  3 Sheets-Sheet 2

INVENTOR
*Herman S. Hoffman*
BY *Stevens, Davis, Miller and Mosher*
ATTORNEYS

Sept. 13, 1955     H. S. HOFFMAN     2,717,624
ANTI-SKID CHAIN
Filed Aug. 13, 1952     3 Sheets-Sheet 3
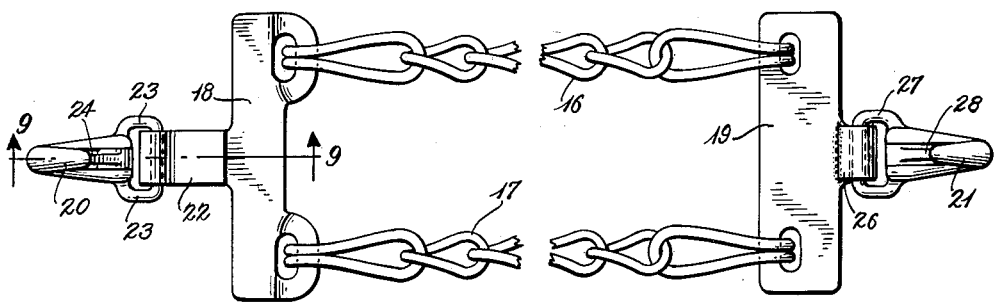
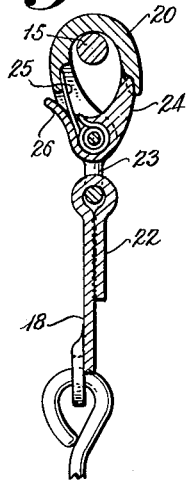 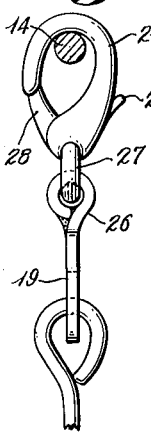 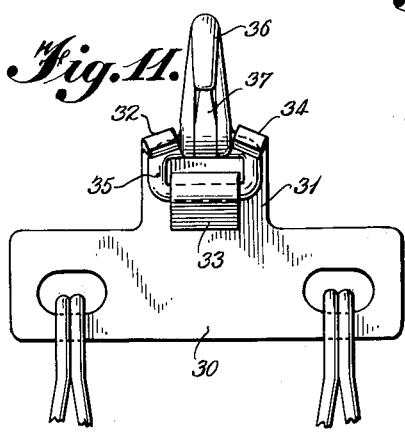 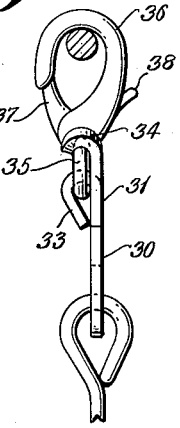
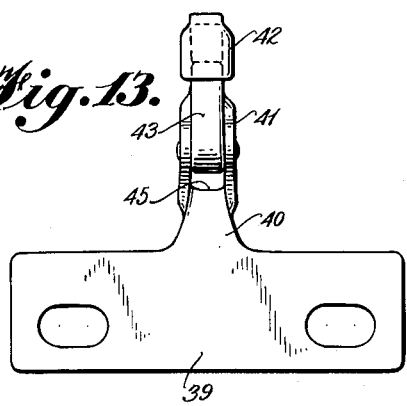 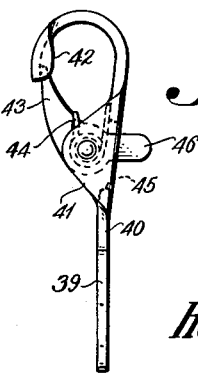
INVENTOR
*Herman S. Hoffman*
BY *Stevens, Davis, Miller and Mosher*
ATTORNEYS United States Patent Office 2,717,624
Patented Sept. 13, 1955

2,717,624

ANTI-SKID CHAIN

Herman S. Hoffman, Washington, D. C.

Application August 13, 1952, Serial No. 304,059

6 Claims. (Cl. 152—236)

This invention relates to anti-skid devices for use with automobiles and is more particularly concerned with improvement in the anti-skid equipment as disclosed in application Serial No. 266,665, filed January 16, 1952, now Patent No. 2,686,550.

In the prior application mentioned above, there is disclosed an anti-skid device in which pairs of chains are disposed obliquely across the tires of an automobile from circumferentially offset anchorage points on the opposite flanges of the tire rims of the wheel. These chains afford improved traction and more comfortable riding qualities as well as being far easier to install than conventional tire chains.

It is proposed according to this invention further to increase the facility with which the chains may be attached and detached from the automobile wheel consistent with high reliability of operation under adverse conditions and low production and maintenance costs.

Other objects and advantages of this invention will be apparent from the following detailed description of several embodiments thereof in conjunction with the annexed drawings wherein:

Figure 8 is a top plan view of a complete anti-skid chain assembly according to the present invention;

Figure 9 is a detailed view in section of a snap hook and cross chain plate used in the assembly of Figure 8;

Figure 10 is a detailed view in elevation of a snap hook and cross chain plate also used in the assembly of Figure 8;

Figure 11 is a plan view of a modified form of snap hook and cross chain plate according to this invention;

Figure 12 is a view in side elevation of the subassembly of Figure 11;

Figure 13 is a plan view of another modified form of snap hook and cross chain plate according to the present invention; and Figure 14 is a view in side elevation of the subassembly of Figure 13.

Figure 1:
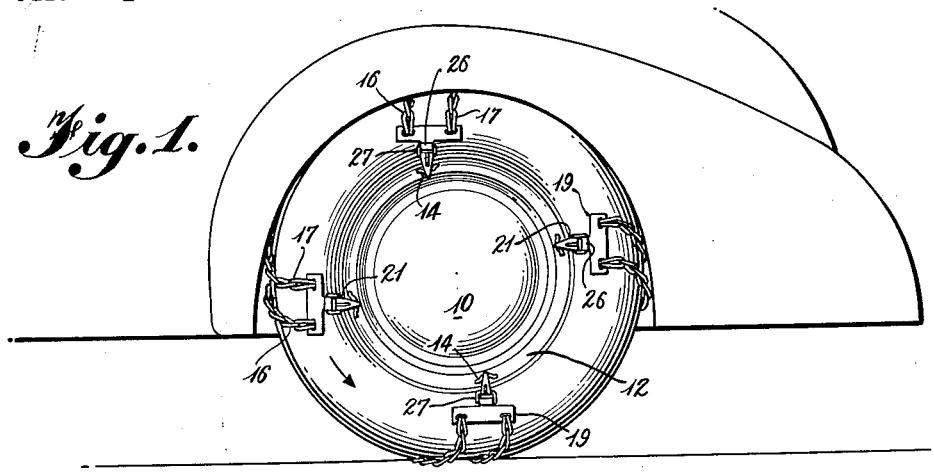
Figure 1 is a view in elevation of an automobile wheel having affixed thereto anti-skid chains according to the present invention.
Figure 2:
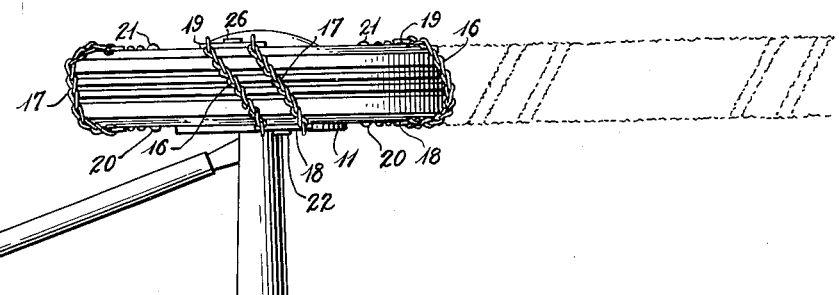
Figure 2 is a plan view of the rear wheels of an automobile showing the position assumed by the anti-skid chains of the present invention.
Figure 2:
Figure 2:
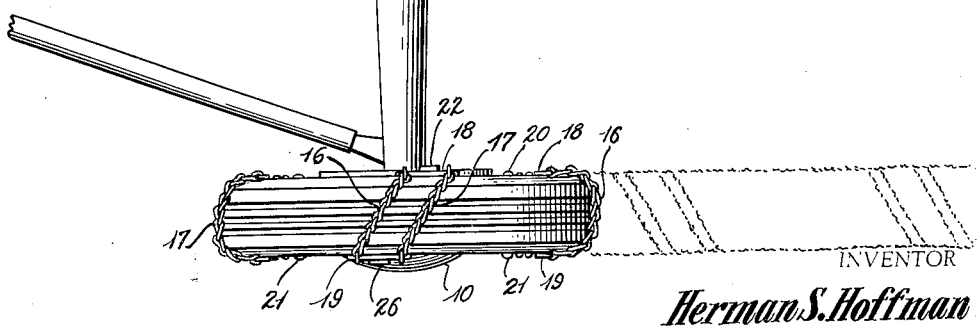
Figure 3:
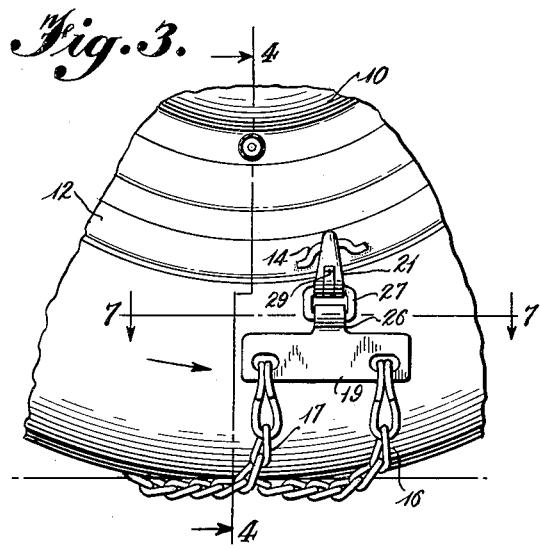
Figure 3 is a detailed view in elevation of the outside of an automobile wheel equipped with chains of the present invention.
Figure 4:
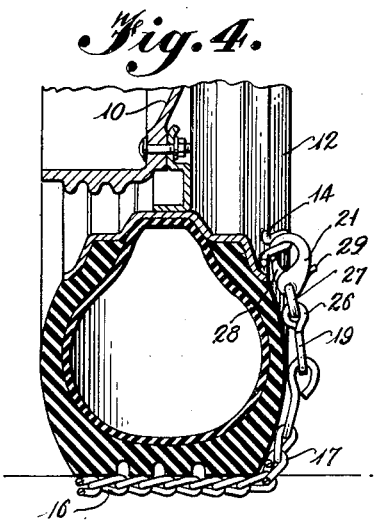
Figure 4 is a view in section taken on the line 4—4 of Figure 3.
Figure 5:
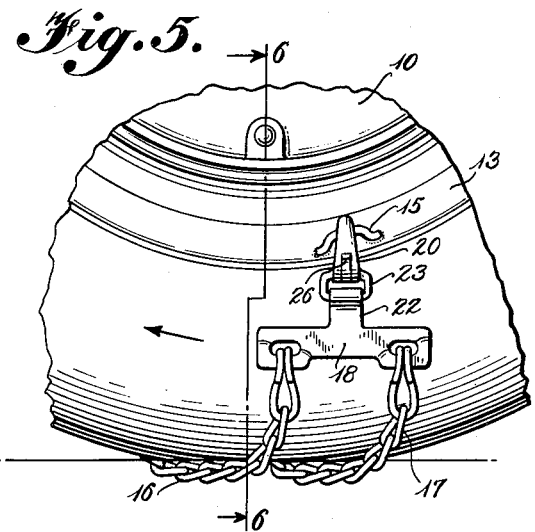
Figure 5 is a detailed view in elevation of the inside of the automobile wheel of Figure 3.
Figure 6:
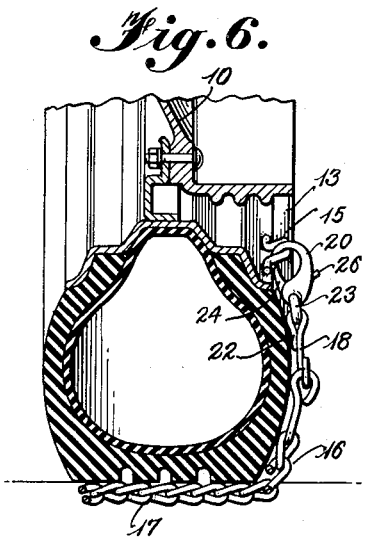
Figure 6 is a view in section taken on the line 6—6 of Figure 5.
Figure 7:
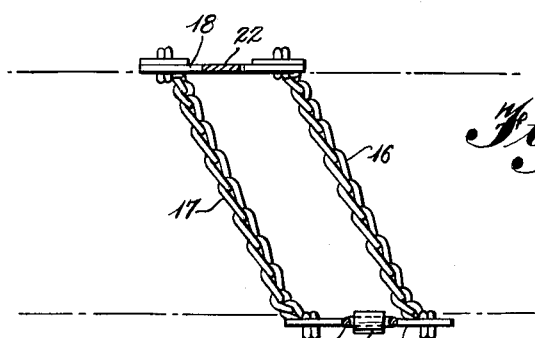
Figure 7 is a view in section taken on the line 7—7 of Figure 3.

Referring now in greater detail to Figures 1 to 7, inclusive, the numerals 10 and 11 represent the rear wheels of an automobile to which the anti-skid devices of the present invention are attached. Since the arrangement with respect to wheels 10 and 11 is identical the description of one will suffice for both.

The wheel 10 is provided with an outer flange 12 and an inner flange 13 which hold the pneumatic tire. To these flanges there are affixed symmetrically arranged, circumferentially spaced stirrups 14 and 15, the stirrups 14 being spaced about the flange 12 in staggered relation to the disposition of the stirrups 15 about the flange 13, so that tire chains extending across the tire from a stirrup 14 to the nearest adjacent stirrup 15 follow an oblique path, as is clearly evident in Figures 1 and 2.

The chains are arranged in four pairs, as can be seen from Figure 1. Since the number of pairs is dependent largely upon the desires of the user of the automobile in relation to the operating conditions which he expects to meet, the actual number is not critical so long as the pairs are symmetrically arranged. Since each pair is like every other pair, it will suffice for purposes of this specification to describe from a structural point of view, a single pair of chains and this can be done with ease if concurrent reference is made to Figures 3 to 10, inclusive.

In Figure 8 the tire chain assembly is disclosed in plan view. It can be seen that it consists of a pair of cross chains 16 and 17 held in spaced relation at their respective ends by cross chain plates 18 and 19. The cross chain plates have affixed thereto snap hooks 20 and 21 and these snap hooks are engaged in the stirrups 15 and 14, respectively, to attach the chain assembly to the wheel. Upon further reference to Figure 8 it will be observed that the cross chain plate 18 includes a shank portion 22 which is somewhat elongated and which is bent at its outer end to define a barrel which envelopes a base ring 23 of the hook 20. Upon reference to Figure 9, it will be noted that the hook 20 is provided with a pivoted latch piece 24 which is biased by a spring 25 to closing position. The latch piece releasing lever 26 protrudes from the shank of the hook opposite to the side in which the latch piece is operative.

The arrangement in conjunction with the cross chain plate 19 is substantially the same except that the shank 26 is shorter than the shank 22. It is, however, provided with a barrel which receives a hook ring 27 and the snap hook 21 is provided with a latch piece 28, spring urged to close position, and a release lever 29 operative from the side of the hook opposite to the latch piece.

When the chain assembly of Figure 8 is attached to the tired wheel the hooks face the respective flanges 12 and 13 so that the respective latch piece releasing levers 29 and 26 face outwardly of the tire in a position accessible to the operator of the vehicle. Because the shank 22 is both rigid and somewhat elongated the attachment of the hook 20 to the stirrup 15 is considerably facilitated. The release of both hooks is enormously facilitated by the location of the latch piece releasing lever on the outside of the assembly as it surrounds the tire (see Figures 3 to 6, inclusive).

Another feature of the present invention which facilitates attachment of the snap hooks to the respective stirrups is demonstrated in Figures 11 and 12 in which a cross chain plate 30 is provided with a projecting part 31 located at the center of the plate and divided into three tines 32, 33 and 34. The center tine 33 is wider than the other two and it is passed through the hook ring 35 of a snap hook 36 and swaged down tightly to hold the hook rigidly in position. The rigidity of the structure is further enhanced by bending over the tines 32 and 34 to grip the edges of the hook ring 35 as can be clearly seen in Figure 11. Referring to Figure 12 it will be seen that with this assembly the hook is rigidly held with its opening in a plane lying somewhat to the left of the plane of the plate 30 as the latter is viewed in Figure 12. The snap hook 36 is provided with a latch piece 37 resiliently biased to close position and a releasing lever 38 lying to the right of the plane of the plate 30 as the latter is viewed in Figure 12.

The arrangement of Figures 11 and 12 renders it possible to apply the hook to the stirrup on the inside flange of a wheel by feel and without having visual access to the particular stirrup to which attachment is being made.

In Figures 13 and 14 an arrangement is shown which has roughly the same operational advantages as the form shown in Figures 11 and 12, but which presents certain features of construction which make it preferable. In this instance the cross chain plate 39 is provided with a centrally extending integral portion 40 which is channeled at 41 and 42. The channel at 41 defines a space for the pivot point for a latch piece 43, the end of which rests in the channel at 42. The latch piece 43 is provided with a spring 44 which biases it to closed position. A slot is cut through the back of the part 40 at 45 to permit a releasing lever 46 of the latch piece 43 to protrude through the plane of the plate 39 in a position to be operative on the opposite side of the hook from the latch piece 43.

It is, of course, apparent that the channel at 42 is not strictly necessary although at least a notch in the end of the hook to receive the end of the latch piece 43 is desirable.

While this invention has been described with reference to several embodiments thereof, it is to be understood that various changes and modifications lie within the spirit, scope and contemplation of the invention.

What is claimed is:

1. In an anti-skid assembly that includes a tired wheel having circumferentially offset stirrups on its opposite flanges and a chain extending obliquely across the tire between the stirrups, the improvement that comprises a snap hook connected to each end of said chain, said snap hooks engaging said stirrups, each snap hook including a latch piece resiliently biased to latching position and a latch releasing mechanism, said latch piece lying within the stirrup and facing the wheel and said releasing mechanism lying on the opposite side of the hook from the latch piece.

2. In an anti-skid assembly that includes a tired wheel having circumferentially offset stirrups on its opposite flanges and a pair of chains extending obliquely across the tire and connected in common to a cross chain plate at both ends, the improvement that comprises a snap hook connected to each cross chain plate at a position between the points of connection of the chains of the pair, said snap hooks engaging said stirrups, a latch piece closing each snap hook and a latch piece releasing mechanism located on the opposite side of each hook from the latch piece.

3. In an anti-skid assembly that includes a tired wheel having circumferentially offset stirrups on its opposite flanges and a pair of chains extending obliquely across the tire and connected in common to a cross chain plate at both ends, the improvement that comprises snap hooks engaging said stirrups, each said snap hook being rigid with its respective cross chain plate and each including a latch piece facing the wheel flange and a latch releasing mechanism on the opposite side of the hook from the latch piece.

4. An anti-skid assembly as claimed in claim 3 in which the hook lies on one side of the plane of the cross chain plate and the latch releasing mechanism lies on the other.

5. An anti-skid assembly that includes a tired wheel having circumferentially offset stirrups on its opposite flanges and a pair of chains extending obliquely across the tires, the improvement that comprises cross chain plates to which the chains are connected in common at their respective ends, each said plate defining an integral hook extending in a direction opposite to the direction of the cross chains and engaging a stirrup, a spring urged latch piece mounted in said hook and a latch releasing mechanism extending through said hook to the opposite side thereof from the latch piece.

6. In an anti-skid assembly that includes a tired wheel having circumferentially offset stirrups on its opposite flanges and a chain extending across the tire between the stirrups, the improvement that comprises a snap hook connected to each end of said chain, said snap hooks engaging said stirrups, each snap hook including a latch piece resiliently biased to latching position and a latch releasing mechanism, said latch piece lying within the stirrup and facing the wheel and said releasing mechanism lying on the opposite side of the hook from the latch piece.

References Cited in the file of this patent

UNITED STATES PATENTS

| 615,345 | Cummings | Dec. 6, 1898 |
| 731,162 | Carter | June 16, 1903 |
| 987,806 | Kibby | Mar. 28, 1911 |
| 1,215,302 | Murray et al. | Feb. 6, 1917 |
| 1,474,563 | Steele | Nov. 20, 1923 |
| 2,091,171 | Watson | Aug. 24, 1937 |
| 2,539,517 | Locke | Jan. 30, 1951 |